US012603306B2

(12) United States Patent
Kim et al.

(10) Patent No.: US 12,603,306 B2
(45) Date of Patent: Apr. 14, 2026

(54) SYSTEM AND METHOD OF DRAINING RESIDUAL WATER OF A FUEL CELL FOR A VEHICLE

(71) Applicants: HYUNDAI MOTOR COMPANY, Seoul (KR); KIA CORPORATION, Seoul (KR)

(72) Inventors: Seon Hak Kim, Yongin-si (KR); Kyu Il Lee, Yongin-si (KR); Da Kyung Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 727 days.

(21) Appl. No.: 17/986,054

(22) Filed: Nov. 14, 2022

(65) Prior Publication Data

US 2023/0378496 A1 Nov. 23, 2023

(30) Foreign Application Priority Data

May 17, 2022 (KR) ........................ 10-2022-0060172

(51) Int. Cl.
| | |
|---|---|
| *H01M 8/04223* | (2016.01) |
| *H01M 8/04228* | (2016.01) |
| *H01M 8/04291* | (2016.01) |
| *H01M 8/0432* | (2016.01) |
| *H01M 8/04828* | (2016.01) |
| *H01M 8/04955* | (2016.01) |

(52) U.S. Cl.
CPC ... *H01M 8/04253* (2013.01); *H01M 8/04228* (2016.02); *H01M 8/04291* (2013.01); *H01M 8/0432* (2013.01); *H01M 8/04828* (2013.01); *H01M 8/04955* (2013.01); *H01M 2250/20* (2013.01)

(58) Field of Classification Search
CPC ......... H01M 8/04253; H01M 8/04228; H01M 8/04291; H01M 8/0432; H01M 8/04828; H01M 8/04955; H01M 8/04179; H01M 8/04492; H01M 8/04776
See application file for complete search history.

(56) References Cited

U.S. PATENT DOCUMENTS

| | | | | |
|---|---|---|---|---|
| 2016/0133963 A1* | 5/2016 | Naganuma | ........ | H01M 8/04253 |
| | | | | 429/414 |
| 2018/0166720 A1* | 6/2018 | Asano | ........................ | H02J 7/34 |
| 2020/0119375 A1* | 4/2020 | You | .................... | H01M 8/04492 |
| 2020/0358114 A1* | 11/2020 | Park | .................. | H01M 8/04179 |

FOREIGN PATENT DOCUMENTS

KR 20140074556 A 6/2014

* cited by examiner

*Primary Examiner* — Stewart A Fraser
(74) *Attorney, Agent, or Firm* — Lempia Summerfield Katz LLC

(57) ABSTRACT

A system and a method of draining residual water of a fuel cell for a vehicle are proposed. The system includes a fuel cell; an outdoor temperature sensor measuring an outdoor temperature; a drainer draining residual water in the fuel cell; and a controller previously controlling the drainer to drain the residual water in the fuel cell before parking of the vehicle is completed or an operation of the fuel cell is terminated, when a parking available situation is detected during driving of the vehicle in a state where the outdoor temperature is equal to or less than a reference temperature.

19 Claims, 5 Drawing Sheets

CONTROLLER

OUTDOOR TEMPERATURE SENSOR

FUEL CELL

DRAINER (AIR COMPRESSOR)

*200*

*100*

*300*

------------ COMPRESSOR RPM

——————— FUEL CELL VOLTAGE

FUEL CELL STARTING COMPLETION

1

SYSTEM AND METHOD OF DRAINING RESIDUAL WATER OF A FUEL CELL FOR A VEHICLE

CROSS REFERENCE TO RELATED APPLICATION

The present application claims priority to and the benefit of Korean Patent Application No. 10-2022-0060172, filed May 17, 2022, the entire contents of which are incorporated herein by reference.

BACKGROUND

Field

The present disclosure relates to a system and method of draining residual water of a fuel cell for a vehicle in order to reduce time required for performing a low-temperature starting stop process of the fuel cell.

Description of the Related Art

Generally, a fuel cell generates electric energy through a chemical reaction between hydrogen that is fuel and oxygen that is contained in air. Such a fuel cell is applied to a fuel cell vehicle or the like. An electric motor operates with the electric energy generated through the fuel cell, and thus drives the vehicle. At this time, the fuel cell generates water through the chemical reaction between hydrogen and oxygen. The generated water reduces an active surface area of a catalyst layer of the fuel cell, thereby causing a loss in an electrode reaction, and increases a mass transfer resistance. The mass transfer resistance causes a voltage drop, thereby deteriorating the performance of the fuel cell. Thus, the fuel cell vehicle has the function of frequently draining the generated water during the driving.

Even if the generated water is frequently drained, some water may remain in the fuel cell without being drained. Particularly, when the starting of the fuel cell vehicle is completed in winter, a phenomenon in which the generated water (residual water) remaining in the fuel cell is frozen frequently occurs. Due to the freezing of the residual water in the fuel cell, it becomes difficult to smoothly supply oxygen and hydrogen, and a normal chemical reaction does not occur, so the performance of the fuel cell is deteriorated. Further, we have discovered that smooth stability is not ensured even when the fuel cell vehicle is restarted after a predetermined period of time has passed from a state in which the operation of the fuel cell vehicle is terminated. Therefore, when the operation of the fuel cell is terminated in winter, the fuel cell vehicle supplies a large amount of air to the fuel cell under a non-load condition for a certain period of time to drain and remove the residual water in the fuel cell, thereby performing Cold Shutdown (CSD) to prevent damage to the fuel cell.

The CSD is a key technology to prevent damage caused by the freezing of the residual water in the fuel cell in winter. The CSD drives an air compressor of a vehicle so as to supply a large amount of air to the fuel cell under a non-load condition for a certain period of time. However, when the drain time of the residual water is excessive, the emotional quality of the vehicle may be deteriorated due to the noise of the air compressor. In addition, if time for performing the CSD is excessive, the fuel cell may be exposed to a high potential, and thus the durability of the fuel cell may be reduced.

The foregoing is intended merely to aid in the understanding of the background of the present disclosure, and is not intended to mean that the present disclosure falls within the purview of the related art that is already known to those having ordinary skill in the art.

SUMMARY OF THE PRESENT DISCLOSURE

The present disclosure provides a system and method of draining residual water of a fuel cell for a vehicle. In particular, when a parking available situation is detected while a fuel cell vehicle is driving, the residual water in the fuel cell is preemptively drained before the parking of the vehicle is completed or the operation of the fuel cell is terminated, thus reducing time required for performing the low-temperature starting stop process of the fuel cell.

In one embodiment of the present disclosure, a system of draining residual water of a fuel cell for a vehicle may include: a fuel cell; an outdoor temperature sensor measuring an outdoor temperature; and a drainer draining residual water in the fuel cell. The system further includes a controller previously controlling the drainer to drain the residual water in the fuel cell before parking of the vehicle is completed or an operation of the fuel cell is terminated, when a parking available situation is detected during driving of the vehicle in a state where the outdoor temperature is equal to or less than a reference temperature.

The drainer may include an air compressor connected to the fuel cell and supplying air to the fuel cell to drain the residual water in the fuel cell.

The reference temperature may be a temperature at which the residual water in the fuel cell starts to freeze.

The parking available situation may be a case where an automatic parking function of the vehicle is activated, a case where it is confirmed that the vehicle enters a parking lot, or a case where a vehicle speed is low and a parking driving line is recognized around the vehicle.

The controller may control the drainer after starting of the fuel cell is stopped in a case where the parking available situation is not detected during the driving of the vehicle, thus draining the residual water in the fuel cell.

The controller may limit an operating voltage of the fuel cell to be less than a reference voltage when the parking available situation is detected. The controller may control driving of the drainer based on a set minimum air supply supercharge ratio to drain the residual water in the fuel cell.

The reference voltage may be a maximum voltage at which the fuel cell may output within an endurance limit.

The minimum air supply supercharge ratio may be a minimum ratio of an amount of air required for draining the residual water in the fuel cell to an amount of air required for power generation of the fuel cell.

The drainer may be an air compressor for supplying air to the fuel cell, and the controller may control that the drainer supplies air at the set minimum air supply supercharge ratio or more, or the drainer is driven at a minimum rpm (i.e., minimum revolutions per minute) or more, when the driving of the drainer is controlled in a case where the parking available situation of the vehicle is detected.

The controller may determine a residual water drain time according to an outdoor temperature measured before the parking available situation of the vehicle is detected. The controller may count, as parking time, time taken from time when the parking available situation of the vehicle is detected to time when the parking of the vehicle is completed or the starting of the fuel cell is terminated.

The residual water drain time may be time required to drain the residual water in the fuel cell according to the measured outdoor temperature, and the residual water drain time may be increased as the outdoor temperature is decreased.

The controller may be provided with a data map in which the outdoor temperature is an input value and the residual water drain time is an output value.

The controller may compare the parking time after the parking of the vehicle is completed or the operation of the fuel cell is terminated with the residual water drain time. The controller may control driving time of the drainer according to a result obtained by comparing the parking time with the residual water drain time, thus draining the residual water in the fuel cell.

The drainer may be the air compressor for supplying air to the fuel cell, and the controller may control that the drainer is driven at a reference rpm or the drainer supplies air at a reference air supply flow rate when the residual water in the fuel cell is drained after the parking of the vehicle is completed or the operation of the fuel cell is terminated.

The controller may control the drainer for a minimum time to drain the residual water in the fuel cell, in a case where the parking time is greater than the residual water drain time after the parking of the vehicle is completed or the operation of the fuel cell is terminated.

The minimum time may be a minimum time for which the voltage of the fuel cell is maintained at an Open Circuit Voltage (OCV) and the residual water in the fuel cell is drained so as to suppress current generation after the starting of the fuel cell is terminated.

When the parking time is smaller than the residual water drain time after the parking of the vehicle is completed or the operation of the fuel cell is terminated, the controller may control the drainer for an additional time that is equal to a sum of the minimum time and a difference between the residual water drain time and the parking time, thus draining the residual water in the fuel cell.

In another embodiment of the present disclosure, a method of draining residual water of a fuel cell for a vehicle may include: determining whether a parking available situation is detected during driving of the vehicle in a state where an outdoor temperature is equal to or less than a reference temperature. The method further includes previously controlling a drainer before parking of the vehicle is completed or an operation of the fuel cell is terminated in a case where the parking available situation is detected during the driving of the vehicle, thus draining the residual water in the fuel cell.

In determining whether the parking available situation is detected during the driving of the vehicle, the controller may determine a residual water drain time according to outdoor temperature before the parking available situation of the vehicle is detected.

The method may further include, after draining the residual water in the fuel cell, comparing the residual water drain time with the parking time by the controller when the parking of the vehicle is completed or the operation of the fuel cell is terminated; and controlling the driving time of the drainer by the controller according to a result of comparison of the residual water drain time with the parking time, thus draining the residual water in the fuel cell.

A system and method of draining residual water of a fuel cell for a vehicle according to the present disclosure are advantageous in that a parking available situation is detected while a fuel cell vehicle is driving, and the residual water in the fuel cell is preemptively drained before the parking of the vehicle is completed or the operation of the fuel cell is terminated, thus reducing time required for performing the low-temperature starting stop process of the fuel cell, and preventing the emotional quality of the vehicle from being deteriorated.

Further, a voltage is controlled when residual water in a fuel cell is drained before the parking of a vehicle is completed or the operation of the fuel cell is terminated, thus preventing the fuel cell from being exposed to a high potential, and preventing the durability of the fuel cell from being reduced.

BRIEF DESCRIPTION OF THE DRAWINGS

The above and other objectives, features, and other advantages of the present disclosure should be more clearly understood from the following detailed description when taken in conjunction with the accompanying drawings, in which:

FIG. 1 is a diagram illustrating a system of draining residual water of a fuel cell for a vehicle according to an embodiment of the present disclosure;

DETAILED DESCRIPTION

Figure 2:
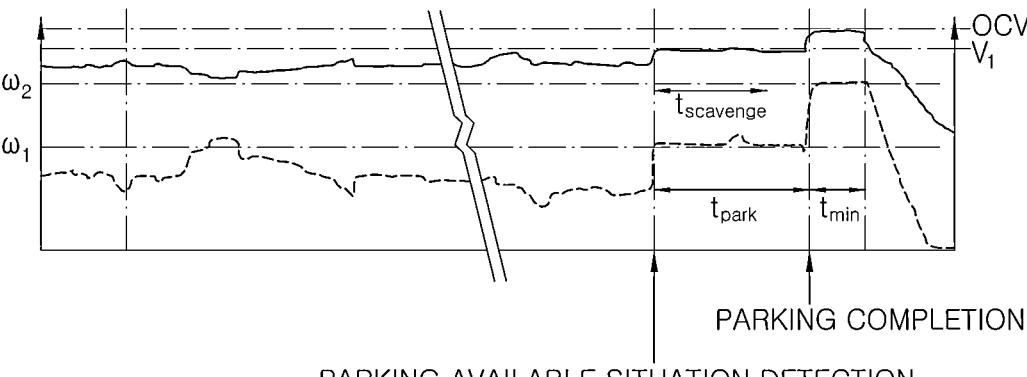
FIGS. 2 to 4 are graphs illustrating a change in voltage of the fuel cell and a change in rpm of an air compressor according to time when residual water in the fuel cell is drained according to an embodiment of the present disclosure.

When it is determined that the detailed description of the known art related to the present disclosure may be obscure the gist of the present disclosure, the detailed description thereof is omitted. Further, it is to be understood that the accompanying drawings are merely for making those skilled in the art easily understand embodiments disclosed herein, and the present disclosure is intended to cover not only exemplary embodiments disclosed herein, but also various alternatives, modifications, equivalents and other embodiments that fall within the spirit and scope of the present disclosure.

It should be understood that, although the terms "first", "second", etc. may be used herein to describe various elements, these elements should not be limited by these terms. These terms are only used to distinguish one element from another element.

It should be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

Herein, the singular forms are intended to include the plural forms as well, unless the context clearly indicates otherwise.

It should be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof. When a component, device, element, or the like of the present disclosure is described as having a purpose or performing an operation, function, or the like, the component, device, or element should be considered herein as being "configured to" meet that purpose or to perform that operation or function.

Hereinafter, the present disclosure is explained in detail by describing exemplary embodiments of the present disclosure with reference to the accompanying drawings. The same reference numerals are used throughout the drawings to designate the same or similar components.

Figure 1:
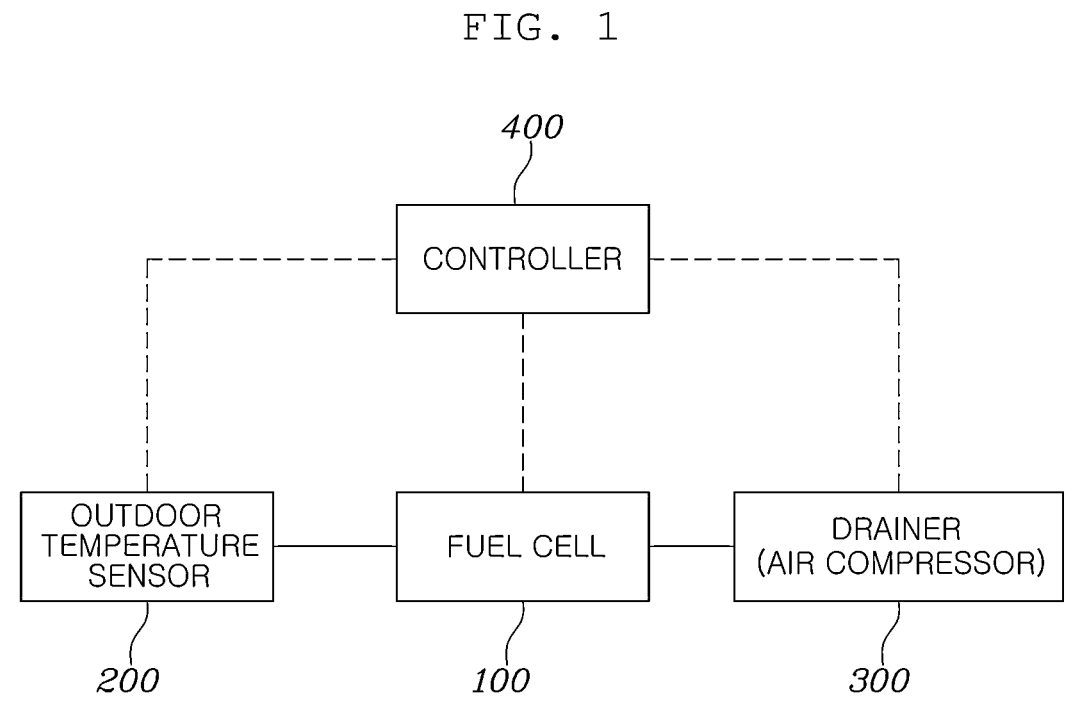
Figure 3:
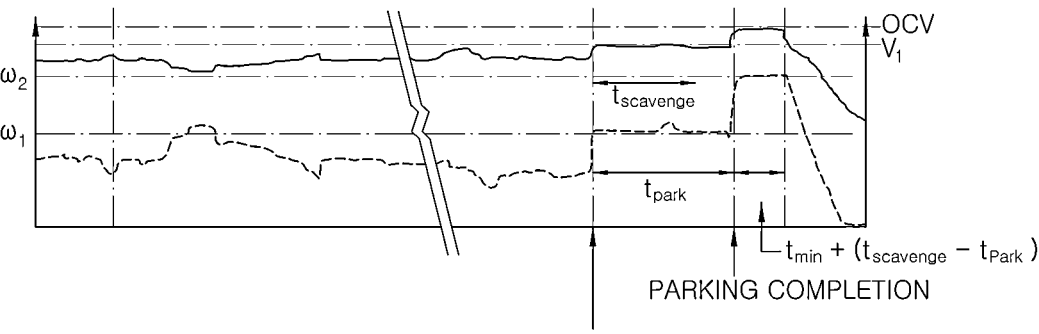
Figure 4:
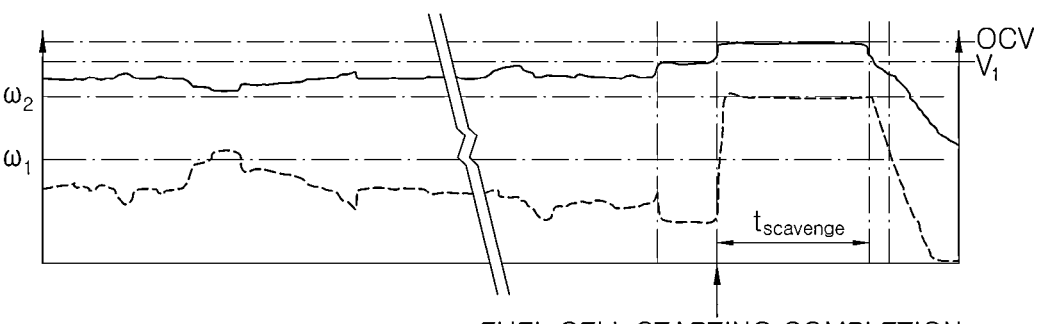
Figure 5:
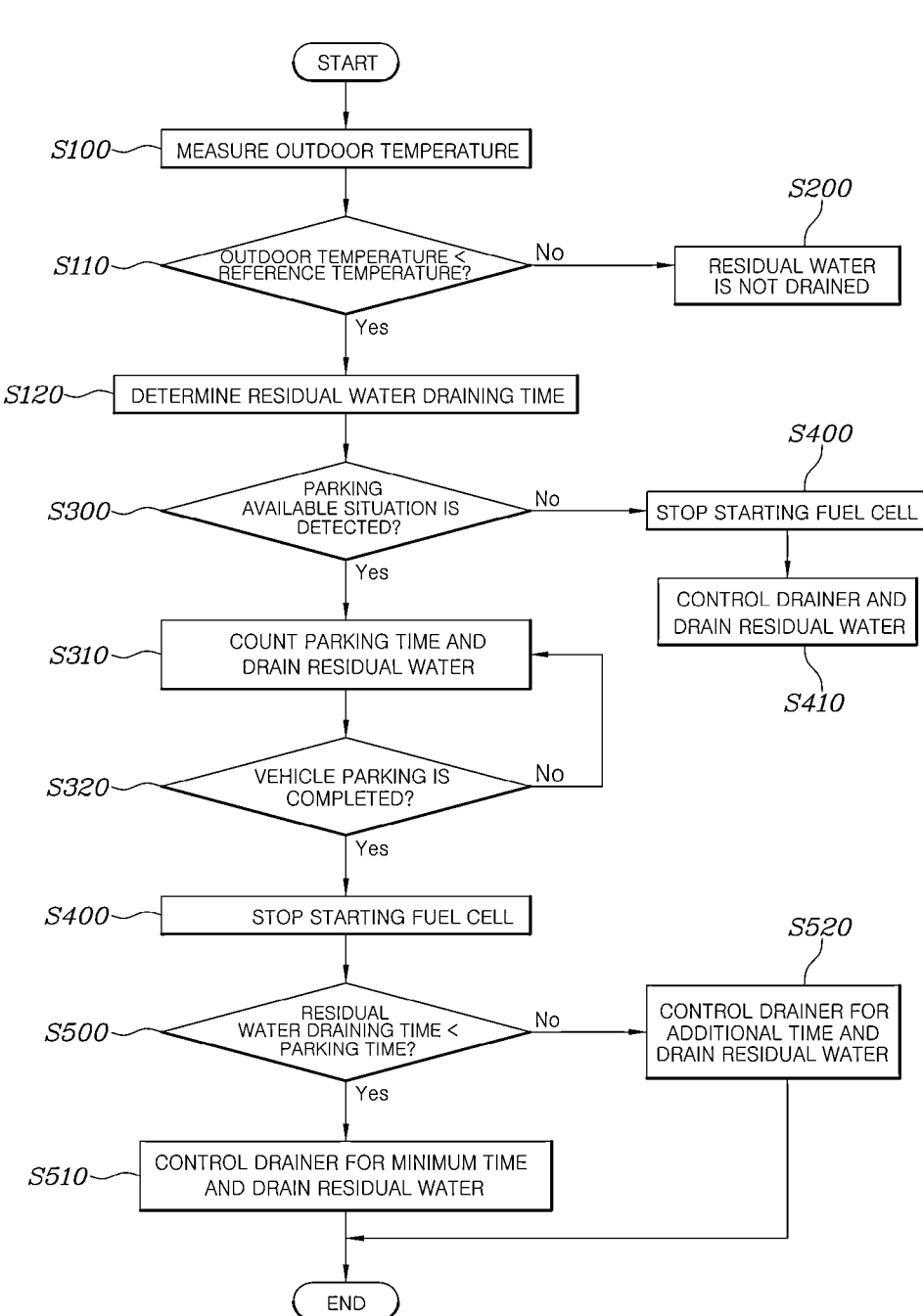
FIG. 5 is a flowchart illustrating a method of draining residual water of a fuel cell for a vehicle according to an embodiment of the present disclosure.

FIG. 1 is a diagram illustrating a system of draining residual water of a fuel cell for a vehicle according to an embodiment of the present disclosure, FIGS. 2 to 4 are graphs illustrating a change in voltage of the fuel cell and a change in rpm of an air compressor according to time when residual water in the fuel cell is drained according to an embodiment of the present disclosure, and FIG. 5 is a flowchart illustrating a method of draining residual water of a fuel cell for a vehicle according to an embodiment of the present disclosure.

FIG. 1 is a diagram illustrating a system of draining residual water of a fuel cell for a vehicle. As shown in FIG. 1, the system of draining residual water of the fuel cell 100 for the vehicle includes: a fuel cell 100; an outdoor temperature sensor 200 measuring an outdoor temperature; and a drainer 300 draining the residual water in the fuel cell 100. The system further includes a controller 400 previously controlling the drainer 300 to drain the residual water in the fuel cell 100 before the parking of the vehicle is completed or the operation of the fuel cell 100 is terminated, when a parking available situation is detected during the driving of the vehicle in a state where the outdoor temperature is equal to or less than a reference temperature.

The controller 400 according to an embodiment of the present disclosure may be implemented through a non-volatile memory (not shown) configured to store data about an algorithm configured to control the operation of various components of a vehicle or a software instruction for reproducing the algorithm, and a processor (not shown) configured to perform an operation, which is described below, using the data stored in the memory. In this regard, the memory and the processor may be implemented as separate chips. Alternatively, the memory and the processor may be implemented as a single integrated chip, and the processor may take the form of one or more processors.

In the fuel cell 100, water is generated due to the reaction of hydrogen that is fuel and oxygen contained in the air, and the generated water is periodically drained to the outside. When the starting of the fuel cell 100 is terminated, water that is not drained to the outside remains in the fuel cell 100. This is referred to as residual water. When the starting of the fuel cell 100 is terminated, the residual water usually remains in the fuel cell 100 without being drained to the outside. However, when the starting of the fuel cell 100 is terminated in a low-temperature environment and the residual water remains in the fuel cell 100, the durability of the fuel cell 100 may be damaged due to the freezing of the residual water.

Therefore, in the low-temperature environment, it is desired to remove the residual water in the fuel cell 100. Conventionally, after the operation of the fuel cell 100 is terminated, a Cold Shutdown (CSD) process of removing the residual water in the fuel cell 100 is performed using the drainer 300 connected to the fuel cell 100. However, when the CSD process is performed after the operation of the fuel cell 100 is terminated, the emotional quality of a driver may be deteriorated due to an excessive amount of time for draining the residual water. Further, the fuel cell 100 is exposed to a high potential while the CSD process is performed after the operation of the fuel cell 100 is terminated. If the exposure time to the high potential is prolonged, this may adversely affect the durability of the fuel cell 100. Thus, the present disclosure has the effect of shortening the drain time of the residual water after the operation of the fuel cell 100 is terminated, by preemptively draining the residual water in the fuel cell 100 before the parking of the vehicle is completed or the operation of the fuel cell 100 is terminated. Furthermore, by reducing the exposure time of the fuel cell 100 to the high potential, a reduction in durability of the fuel cell 100 is prevented.

In one embodiment, the drainer 300 includes an air compressor 300 that is connected to the fuel cell 100 and supplies air to the fuel cell 100 to drain the residual water in the fuel cell 100. The drainer 300 that drains the residual water of the fuel cell 100 may be present in various forms, such as a drain valve, a drain line, or the air compressor 300. The present disclosure may drain all the residual water in the fuel cell 100 so as to prevent the residual water in the fuel cell 100 from being frozen in the low-temperature environment. In particular, the residual water in the fuel cell 100 is drained by blowing air therein through the driving of the air compressor 300. Therefore, the expression "the controller 400 controls the drainer 300" has the same meaning as the expression "the controller 400 controls the air compressor 300".

In order to previously drain the residual water in the fuel cell 100 before the parking of the vehicle is completed or the operation of the fuel cell 100 is terminated, the controller 400 checks the outdoor temperature through the outdoor temperature sensor 200. The controller 400 compares the outdoor temperature measured by the outdoor temperature sensor 200 with the reference temperature to control the drain of the residual water in the fuel cell 100 in a state where the outdoor temperature is equal to or more than the reference temperature. In one embodiment, the reference temperature is a temperature at which the residual water in the fuel cell 100 starts to freeze. If the outdoor temperature is a temperature at which the freezing of the residual water does not occur, it is unnecessary to drain the residual water in the fuel cell 100. However, when the outdoor temperature falls below the temperature at which the residual water freezes, the residual water in the fuel cell 100 may freeze, so the durability of the fuel cell 100 may be reduced. Thus, the controller 400 sets the reference temperature, and needs to drain the residual water in the fuel cell 100 when the outdoor temperature measured through the outdoor temperature sensor 200 falls below the reference temperature.

The controller 400 determines the residual water drain time according to the outdoor temperature measured before the parking available situation of the vehicle is detected. The residual water drain time means time at which it is desired to drain the residual water in the fuel cell 100 according to the measured outdoor temperature. The lower the outdoor temperature is, the longer the residual water drain time is. As the outdoor temperature is reduced, the possibility that the residual water in the fuel cell 100 freezes is increased. Thus, it is desired to drain the residual water for a long time so that no residual water remains therein. Therefore, the lower the outdoor temperature is, the longer the residual water drain time needs to be. Further, in order to determine the residual water drain time according to the outdoor temperature, the controller 400 is provided with a data map in which the outdoor temperature is an input value and the residual water drain time is an output value. Since the controller 400 is provided with the data map, the residual water drain time corresponding to the outdoor temperature measured by the outdoor temperature sensor 200 may be directly determined.

On the other hand, the parking available situation is a case where the automatic parking function of the vehicle is activated, a case where it is confirmed that the vehicle enters a parking lot, or a case where a vehicle speed is low and a parking driving line is recognized around the vehicle. When the automatic parking function of the vehicle is activated, the controller 400 may determine that the vehicle is currently in a situation where it may park. Further, the controller 400 may determine that the entry of the vehicle into the parking lot is also the parking available situation, through a navigation system of the vehicle. Furthermore, the controller 400 may detect the vehicle and the surrounding environment information to determine that the vehicle is in the parking available situation even when the vehicle speed is low and the parking driving line is recognized around the vehicle. As discussed above, the present disclosure is to preemptively drain the residual water in the fuel cell 100 before the parking of the vehicle is completed or the operation of the fuel cell 100 is terminated. The controller 400 needs to determine the parking available situation by checking a situation while the vehicle is driving.

FIGS. 2 to 4 are graphs illustrating a change in voltage of the fuel cell and a change in rpm of the air compressor according to time when residual water in the fuel cell is drained according to an embodiment of the present disclosure. FIGS. 2 and 3 are graphs illustrating a case where the parking available situation is detected during the driving of the vehicle, and FIG. 4 is a graph illustrating a case where the parking available situation is not detected during the driving of the vehicle. Hereinafter, the present disclosure is described with reference to FIGS. 2 to 4.

The controller 400 controls the drainer 300 after the starting of the fuel cell 100 is stopped in the case where the parking available situation is not detected during the driving of the vehicle, thus draining the residual water in the fuel cell 100. When the parking available situation of the vehicle is not detected, the controller 400 does not previously drain the residual water in the fuel cell 100. Subsequently, when the vehicle is parked or the starting of the fuel cell 100 is terminated, the controller 400 controls the drainer 300 to drain the residual water in the fuel cell 100. As shown in FIG. 4, the controller 400 sets the rpm of the drainer 300, especially the air compressor 300 as a reference rpm to drain the residual water in the fuel cell 100. In the graph of FIG. 4, the reference rpm of the air compressor 300 is expressed as $\omega_2$. Further, the controller 400 controls to drive the drainer 300 during the residual water drain time that is determined according to the measured outdoor temperature. In the graph, the residual water drain time is expressed as $t_{scavenge}$. It is desired to determine the residual water drain time according to the outdoor temperature before the parking available situation of the vehicle is detected, and it is necessary to drain the residual water in the fuel cell 110 during the determined residual water drain time. Therefore, the controller 400 controls the driving of the drainer 300 during the determined residual water drain time to drain the residual water in the fuel cell 100.

As shown in FIG. 4, when the residual water in the fuel cell 100 is drained during the residual water drain time, the controller 400 does not separately control the voltage of the fuel cell 100. If a separate voltage control is not performed, the voltage of the fuel cell 100 is maintained at an Open Circuit Voltage (OCV). When the controller 400 controls the voltage of the fuel cell 100, water may be additionally generated due to the current draw of the fuel cell 100. For this reason, even if the residual water in the fuel cell 110 is drained during the residual water drain time, the residual water may still remain in the fuel cell 100 due to the additionally generated water. Therefore, when the parking available situation is not detected, the controller 400 does not control the voltage of the fuel cell 100 during the draining of the residual water in the fuel cell 100.

However, as shown in FIGS. 2 and 3, when the parking available situation is detected, the controller 400 limits the operating voltage of the fuel cell 100 to be less than the reference voltage. Here, the reference voltage of the fuel cell 100 means a maximum voltage at which the fuel cell 100 may output within the endurance limit of the fuel cell 100. The reference voltage should be less than an Open Circuit Voltage (OCV) value of the fuel cell 100. When the parking available situation is detected, the controller 400 supplies air in a state where the fuel cell 100 is starting, thus draining the residual water in the fuel cell 100. If air is supercharged in a state where the fuel cell 100 is starting, the voltage of the fuel cell 100 rises. When the voltage of the fuel cell 100 continues to rise, this may adversely affect the durability of the fuel cell 100. Thus, it is desired for the controller 400 to designate a reference voltage at a level that does not impair the durability of the fuel cell 100, and to limit the operating voltage of the fuel cell 100 so that it does not exceed the reference voltage.

Further, the controller 400 controls the driving of the drainer 300 based on a set minimum air supply supercharge ratio to drain the residual water in the fuel cell 100. The minimum air supply supercharge ratio means the minimum ratio of the amount of air required for draining the residual water in the fuel cell 100 to the amount of air required for power generation of the fuel cell 100. Therefore, when the driving of the drainer 300 is controlled in the case where the parking available situation of the vehicle is detected, the controller 400 controls that the drainer 300 supplies air at the set minimum air supply supercharge ratio or more, or the drainer 300 is driven at a minimum rpm or more. In this case, the drainer 300 is the air compressor 300 that supplies air to the fuel cell 100. The draining of the residual water in the fuel cell 100 by driving the drainer 300 means the draining of the residual water in the fuel cell 100 by blowing air through the drainer 300. Thus, it is desired to drain the residual water in the fuel cell 100 by setting the minimum air supply supercharge ratio and blowing a larger amount of air compared to the conventional introduced air amount.

As shown in FIGS. 2 and 3, the controller 400 sets the rpm of the drainer 300, especially the air compressor 300 to be equal to or more than a minimum rpm. In the graphs of FIGS. 2 and 3, the minimum rpm is expressed as w. The controller 400 continuously controls so that the rpm of the air compressor 300 maintains the minimum rpm or more. The air compressor 300 is driven at the minimum rpm or more, thus creating an air flow rate capable of draining the residual water in the fuel cell 100. If the amount of air required due to the minimum air supply supercharge ratio is greater than the amount of air introduced due to the minimum rpm of the air compressor 300, the controller 400 may increase the rpm of the air compressor 300. The controller 400 may drive the air compressor 300 under the condition that a larger amount of air may be introduced as compared to the set minimum air supply supercharge ratio or the minimum rpm. Thus, the residual water in the fuel cell 100 can be effectively drained before the vehicle is parked or the operation of the fuel cell 100 is terminated.

On the other hand, the controller 400 counts, as parking time, time taken from time when the parking available situation of the vehicle is detected to time when the parking of the vehicle is completed or the operation of the fuel cell 100 is terminated. The counted parking time means time when the residual water in the fuel cell 100 is preemptively drained from time when the parking available situation of the vehicle is detected to time when the parking of the vehicle is completed or the operation of the fuel cell 100 is terminated. Therefore, the controller 400 compares the counted parking time with the residual water drain time derived according to the measured outdoor temperature to determine the drain time of the residual water after the parking of the vehicle is completed or the operation of the fuel cell 100 is terminated.

The controller 400 compares the parking time after the parking of the vehicle is completed or the operation of the fuel cell 100 is terminated with the residual water drain time, and controls the driving time of the drainer 300 according to the result obtained by comparing the parking time with the residual water drain time, thus draining the residual water in the fuel cell 100. The residual water drain time is time required for completely draining the residual water in the fuel cell 100 according to the outdoor temperature. Further, the parking time is time required for draining some of the residual water in the fuel cell 100 before the parking of the vehicle is completed or the operation of the fuel cell 100 is terminated. Thus, the controller 400 may estimate the amount of the residual water in the fuel cell 100, which is drained during the parking time, by comparing the residual water drain time derived according to the outdoor temperature with the counted parking time. Further, the controller 400 controls the driving time of the drainer 300 according to the result obtained by comparing the parking time with the residual water drain time. When the residual water in the fuel cell 100 is drained after the parking of the vehicle is completed or the operation of the fuel cell 100 is terminated, the drainer 300 is driven under the same condition. By controlling the driving time of the drainer 300 according to the result obtained by comparing the parking time with the residual water drain time, residual water or droplets remaining in the fuel cell 100 after being partially drained may be effectively removed.

After the parking of the vehicle is completed or the operation of the fuel cell 100 is terminated, residual water or droplets may remain in the fuel cell 100. Thus, it is necessary for the controller 400 to remove the residual water or droplets remaining in the fuel cell 100 by driving the drainer 300. Further, the controller 400 controls that the voltage of the fuel cell 100 is maintained at the Open Circuit Voltage (OCV) when the drainer 300 is driven. The controller 400 may suppress additional water generation in the fuel cell 100 by maintaining the voltage of the fuel cell 100 at the OCV. However, when the drainer 300 is driven for a long time after the parking of the vehicle is completed or the operation of the fuel cell 100 is terminated, there is a problem in that time the fuel cell 100 is exposed to the OCV is increased. Since the OCV is a high voltage value, the long exposure of the fuel cell 100 to the OCV may adversely affect the durability of the fuel cell 100. Thus, the controller 400 needs to control the driving time of the drainer 300 to be short after the parking of the vehicle is completed or the operation of the fuel cell 100 is terminated. Further, in order to drain the residual water in the fuel cell 100, it is necessary to control the drainer 300 after the parking of the vehicle is completed or the operation of the fuel cell 100 is terminated under a condition higher than the condition in which the drainer 300 is controlled before the parking of the vehicle is completed or the operation of the fuel cell 100 is terminated.

In detail, the controller 400 controls that the drainer 300 is driven at the reference rpm or the drainer 300 supplies air at a reference air supply flow rate when the residual water in the fuel cell 100 is drained after the parking of the vehicle is completed or the operation of the fuel cell 100 is terminated. Here, the drainer 300 is the air compressor 300 for supplying air to the fuel cell 100, and the reference rpm has a value higher than minimum rpm before the parking of the vehicle is completed or the operation of the fuel cell 100 is terminated. Referring to FIGS. 2 and 3, it can be seen that the reference rpm of the air compressor 300 after time when the parking is completed is higher than the minimum rpm of the air compressor 300 at time when the parking available situation is detected. By driving the air compressor 300 under a higher condition after the parking of the vehicle is completed or the operation of the fuel cell 100 is terminated, it is possible to reduce the driving time for draining the residual water in the fuel cell 100. Further, the reference air supply flow rate may mean an air flow rate required to maximally drain the residual water in the fuel cell 100 in a short period of time. The controller 400 supplies an air flow rate required to drain the residual water in the fuel cell 100 by setting the reference air supply flow rate and driving the air compressor 300.

On the other hand, the controller 400 compares the parking time with the residual water drain time, and controls the driving time of the drainer 300 based on the compared result. In the case where the parking time is greater than the residual water drain time after the parking of the vehicle is completed or the operation of the fuel cell 100 is terminated, the controller 400 controls the drainer 300 for a minimum time to drain the residual water in the fuel cell 100. In the graph of FIG. 2, $t_{park}$ means parking time, $t_{scavenge}$ means residual water drain time, and $t_{min}$ means minimum time. When the parking time is greater than the residual water drain time as shown in FIG. 2, this means that the draining of the residual water in the fuel cell 100 is terminated during the parking time. However, there is a possibility that droplets still remain in the fuel cell 100. Thus, the controller 400 needs to remove the droplets remaining in the fuel cell 100 by driving the drainer 300 even if the parking time is greater than the residual water drain time.

Further, the minimum time means minimum time for which the voltage of the fuel cell 100 is maintained at the OCV and the residual water in the fuel cell 100 is drained so as to suppress current generation after the operation of the fuel cell 100 is terminated. When the residual water is drained after the parking of the vehicle is completed or the operation of the fuel cell 100 is terminated, the controller 400 controls to maintain the voltage of the fuel cell 100 at the OCV. However, as time during which the fuel cell 100 is exposed to the OCV increases, this adversely affects the durability of the fuel cell 100. Thus, it is effective to minimize time for maintaining the voltage at the OCV. Therefore, when the residual water in the fuel cell 100 is drained, the minimum time for maintaining the OCV is derived without adversely affecting the durability of the fuel cell 100. Further, by driving the drainer 300 for the derived minimum time, the controller 400 may effectively drain the residual water in the fuel cell 100 without damaging the durability of the fuel cell 100 after the parking of the vehicle is completed or the operation of the fuel cell 100 is terminated.

However, when the parking time is less than the residual water drain time after the parking of the vehicle is completed or the operation of the fuel cell 100 is terminated, the controller 400 controls the drainer 300 for additional time equal to the sum of the minimum time and a difference between the residual water drain time and the parking time, thus draining the residual water in the fuel cell 100. When the parking time is smaller than the residual water drain time as shown in FIG. 3, this means that all the residual water in the fuel cell 100 is not drained during the parking time. Therefore, the controller 400 needs to remove the residual water remaining in the fuel cell 100 by driving the drainer 300. At this time, the drainer 300 is driven for a time longer than the above-described minimum time, and needs to minimize time at which the voltage of the fuel cell 100 is exposed to the OCV during the draining of the residual water. Therefore, the controller 400 calculates a difference between the residual water drain time and the parking time, and controls to drive the drainer 300 for the additional time that is equal to the sum of the minimum time and the calculated difference. Thus, even if the draining of the residual water in the fuel cell 100 is not completed during the parking time, the exposure time of the fuel cell 100 to the OCV is minimized, thus allowing the residual water in the fuel cell 100 to be drained.

FIG. 5 is a flowchart illustrating a method of draining residual water of a fuel cell for a vehicle according to an embodiment of the present disclosure. The method of draining the residual water of the fuel cell 100 for the vehicle according to the present disclosure includes a step S300 of determining whether a parking available situation is detected during the driving of the vehicle in a state where outdoor temperature is equal to or less than the reference temperature; and a step S310 of previously controlling a drainer 300 before the parking of the vehicle is completed or the operation of the fuel cell 100 is terminated in the case where the parking available situation is detected during the driving of the vehicle, thus draining the residual water in the fuel cell 100.

In step S300 of determining whether the parking available situation is detected during the driving of the vehicle, the controller 400 determines residual water drain time according to outdoor temperature before the parking available situation of the vehicle is detected (S120). First, the controller 400 measures the outdoor temperature through the outdoor temperature sensor 200 so as to determine the residual water drain time according to the outdoor temperature (S100). Based on the measured outdoor temperature, the controller 400 checks whether the outdoor temperature is equal to or less than a set reference temperature (S110). Here, the reference temperature means temperature at which the residual water in the fuel cell 100 starts to freeze. The controller 400 performs a residual water draining process so as to prevent the residual water in the fuel cell 100 from being frozen, by checking whether the outdoor temperature is equal to or more than the reference temperature. If the outdoor temperature does not fall below the reference temperature, the residual water in the fuel cell 100 is not frozen, and the controller 400 does not perform the residual water draining process (S200).

When the outdoor temperature measured by the outdoor temperature sensor 200 is equal to or more than the reference temperature, the controller 400 determines the residual water drain time according to the outdoor temperature (S120). The controller 400 is provided with a data map. Thus, if the outdoor temperature is input, the residual water drain time corresponding thereto is derived. The controller 400 determines the residual water drain time derived according to the input outdoor temperature as time required for draining the residual water in the fuel cell 100.

After the residual water drain time is determined, the controller 400 determines whether the parking available situation is detected during the driving of the vehicle (S300). When the automatic parking function of the vehicle is activated, when it is checked that the vehicle enters the parking lot, or when the vehicle speed of the vehicle is low and the parking driving line is recognized, the controller 400 determines that the parking available situation is detected. If the parking of the vehicle is completed or the operation of the fuel cell 100 is terminated (S400) in the case where the parking available situation is not detected, the controller 400 drains the residual water in the fuel cell 100 (S410). At this time, the controller 400 controls the driving of the drainer 300 to drain the residual water in the fuel cell. When the residual water in the fuel cell 100 is drained after the parking of the vehicle is completed or the operation of the fuel cell 100 is terminated, the controller 400 controls such that the drainer 300 is driven at the reference rpm or the air flow rate introduced by the drainer 300 becomes the reference air supply flow rate. Further, the controller controls the driving of the drainer 300 during the residual water drain time determined according to the outdoor temperature to drain the residual water in the fuel cell 100.

When the parking available situation is detected during the driving of the vehicle, the controller 400 controls the driving of the drainer 300 to preemptively drain the residual water in the fuel cell 100, and starts counting the parking time from time when the parking available situation is detected (S310). In order to drain the residual water in the fuel cell 100 during the driving of the vehicle, the controller 400 drives the rpm of the drainer 300 at the minimum rpm or controls the driving of the drainer 300 based on the set minimum air supply supercharge ratio. Since the voltage of the fuel cell 100 increases due to air supercharging while the vehicle is driving, it is necessary to control the voltage of the fuel cell 100 as well. The process of draining the residual water in the fuel cell 100 during the driving of the vehicle is continuously performed until the parking of the vehicle is completed or the operation of the fuel cell 100 is terminated. Further, the controller 400 counts the parking time from time when the parking available situation is detected to time when the parking of the vehicle is completed or the operation of the fuel cell 100 is terminated.

When the parking of the vehicle is completed (S320) and the operation of the fuel cell 100 is terminated (S400), the controller 400 checks the amount of the residual water in the fuel cell 100 and controls to perform the draining operation by the drainer 300. After step S310 of draining the residual water in the fuel cell 100, the method further includes step S500 of comparing the residual water drain time with the parking time by the controller 400 when the parking of the vehicle is completed or the operation of the fuel cell 100 is terminated; and steps S510 and S520 of controlling the driving time of the drainer 300 by the controller 400 according to the result of the comparison of the residual water drain time with the parking time, thus draining the residual water in the fuel cell 100.

The controller 400 compares the residual water drain time determined according to the outdoor temperature with the counted parking time (S500). When the parking time is greater than the residual water drain time, the controller 400 determines that the residual water in the fuel cell 100 is completely drained during the parking time. However, the droplets or the residual water that are not drained may remain in the fuel cell 100. Thus, the controller 400 controls the driving of the drainer 300 to drain the residual water in the fuel cell 100, but controls to drive the drainer 300 for a minimum time (S510). Further, in order to suppress water from being additionally generated in the fuel cell 100 when air is supplied to drain the residual water in the fuel cell 100 after the operation of the fuel cell 100 is terminated, the controller 400 controls to maintain the voltage of the fuel cell 100 at the OCV. However, when time for which the fuel cell 100 is maintained at the OCV increases, the durability of the fuel cell 100 decreases. Therefore, the controller 400 needs to drive the drainer 300 for a minimum time after the operation of the fuel cell 100 is terminated, thus draining the residual water in the fuel cell 100. Thus, the controller 400 may set the minimum time and drive the drainer 300 for the minimum time, thereby reducing time during which the fuel cell 100 is exposed to the OCV.

When the residual water drain time is compared with the parking time and the parking time is smaller than the residual water drain time, the controller 400 determines that the residual water in the fuel cell 100 is not completely drained during the parking time. Thus, the controller 400 needs to control the driving of the drainer 300, thereby removing the residual water remaining in the fuel cell 100. When the drainer 300 is driven for the minimum time as before, all the residual water in the fuel cell 100 may not be drained. Therefore, the controller 400 calculates a difference between the residual water drain time and the parking time, and controls the driving of the drainer 300 for additional time that is equal to the sum of the minimum time and the calculated difference (S520). Thus, it is possible to reduce the time when the fuel cell 100 is exposed to the OCV, compared to the draining during the residual water drain time after the operation of the fuel cell 100 is terminated.

As described above, the present disclosure provides a system and method of draining residual water of a fuel cell for a vehicle, in which a parking available situation is detected while a fuel cell vehicle is driving, and the residual water in the fuel cell is preemptively drained before the parking of the vehicle is completed or the operation of the fuel cell is terminated, thus reducing time required for performing the low-temperature starting stop process of the fuel cell, and preventing the emotional quality of the vehicle from being deteriorated.

Further, a voltage is controlled when residual water in a fuel cell is drained before the parking of a vehicle is completed or the operation of the fuel cell is terminated, thus preventing the fuel cell from being exposed to a high potential, and preventing the durability of the fuel cell from being reduced.

Although the present disclosure was described with reference to specific embodiments shown in the drawings, it is apparent to those having ordinary skill in the art that the present disclosure may be changed and modified in various ways without departing from the scope of the present disclosure.

What is claimed is:

1. A system of draining residual water of a fuel cell for a vehicle, the system comprising:
   a fuel cell;
   an outdoor temperature sensor configured to measure an outdoor temperature;
   a drainer configured to drain residual water in the fuel cell; and
   a controller configured to control the drainer to preemptively drain the residual water in the fuel cell before parking of the vehicle is completed or an operation of the fuel cell is terminated, when a parking available situation is detected during driving of the vehicle in a state where the outdoor temperature is equal to or less than a reference temperature,
   wherein the parking available situation is a case where an automatic parking function of the vehicle is activated, a case where the vehicle enters a parking lot, or a case where a vehicle speed is low and a parking driving line is recognized around the vehicle.

2. The system of claim 1, wherein the drainer comprises an air compressor connected to the fuel cell and configured to supply air to the fuel cell to drain the residual water in the fuel cell.

3. The system of claim 1, wherein the reference temperature is a temperature at which the residual water in the fuel cell starts to freeze.

4. The system of claim 1, wherein the controller is configured to control the drainer after starting of the fuel cell is stopped in a case where the parking available situation is not detected during the driving of the vehicle, thus draining the residual water in the fuel cell.

5. The system of claim 1, wherein the controller is configured to determine a residual water drain time according to an outdoor temperature measured before the parking available situation of the vehicle is detected, and further configured to count, as parking time, time taken from time when the parking available situation of the vehicle is detected to time when the parking of the vehicle is completed or starting of the fuel cell is terminated.

6. The system of claim 5, wherein the residual water drain time is a time required to drain the residual water in the fuel cell according to the measured outdoor temperature, and the residual water drain time is increased as the outdoor temperature is decreased.

7. The system of claim 5, wherein the controller is provided with a data map in which the outdoor temperature is an input value and the residual water drain time is an output value.

8. The system of claim 5, wherein the controller is configured to compare the parking time after the parking of the vehicle is completed or the operation of the fuel cell is terminated with the residual water drain time, and the controller is further configured to control driving time of the drainer according to a result obtained by comparing the parking time with the residual water drain time, thus draining the residual water in the fuel cell.

9. The system of claim 8, wherein the drainer is an air compressor for supplying air to the fuel cell, and
   the controller is further configured to control that the drainer is driven at a reference rpm or the drainer supplies air at a reference air supply flow rate when the residual water in the fuel cell is drained after the parking of the vehicle is completed or the operation of the fuel cell is terminated.

10. The system of claim 8, wherein the controller is further configured to control the drainer for a minimum time to drain the residual water in the fuel cell, in a case where the parking time is greater than the residual water drain time after the parking of the vehicle is completed or the operation of the fuel cell is terminated.

11. The system of claim 10, wherein the minimum time is a minimum time for which a voltage of the fuel cell is maintained at an Open Circuit Voltage (OCV) and the residual water in the fuel cell is drained so as to suppress current generation after the starting of the fuel cell is terminated.

12. The system of claim 10, wherein, when the parking time is smaller than the residual water drain time after the parking of the vehicle is completed or the operation of the fuel cell is terminated, the controller is further configured to control the drainer for an additional time that is equal to a sum of the minimum time and a difference between the residual water drain time and the parking time, thus draining the residual water in the fuel cell.

13. A system of draining residual water of a fuel cell for a vehicle, the system comprising:

a fuel cell;

an outdoor temperature sensor configured to measure an outdoor temperature;

a drainer configured to drain residual water in the fuel cell; and a controller configured to control the drainer to preemptively drain the residual water in the fuel cell before parking of the vehicle is completed or an operation of the fuel cell is terminated, when a parking available situation is detected during driving of the vehicle in a state where the outdoor temperature is equal to or less than a reference temperature, wherein the controller is configured to limit an operating voltage of the fuel cell to be less than a reference voltage when the parking available situation is detected, and the controller is further configured to control driving of the drainer based on a set minimum air supply supercharge ratio to drain the residual water in the fuel cell.

14. The system of claim 13, wherein the reference voltage is a maximum voltage at which the fuel cell outputs within an endurance limit.

15. The system of claim 13, wherein the minimum air supply supercharge ratio is a minimum ratio of an amount of air required for draining the residual water in the fuel cell to an amount of air required for power generation of the fuel cell.

16. The system of claim 13, wherein the drainer is an air compressor for supplying air to the fuel cell, and the controller is configured to control the drainer to supply air at the set minimum air supply supercharge ratio or more, or to operate the drainer at a minimum rpm or more, when the driving of the drainer is controlled in a case where the parking available situation of the vehicle is detected.

17. A method of draining residual water of a fuel cell for a vehicle, the method comprising:

determining, by a controller, whether a parking available situation is detected during driving of the vehicle in a state where an outdoor temperature is equal to or less than a reference temperature; and preemptively controlling, by the controller, a drainer before parking of the vehicle is completed or an operation of the fuel cell is terminated in a case where the parking available situation is detected during the driving of the vehicle, thus draining the residual water in the fuel cell, wherein the parking available situation is a case where an automatic parking function of the vehicle is activated, a case where the vehicle enters a parking lot, or a case where a vehicle speed is low and a parking driving line is recognized around the vehicle.

18. The method of claim 17, wherein determining whether the parking available situation is detected during the driving of the vehicle includes determining a residual water drain time according to an outdoor temperature before the parking available situation of the vehicle is detected.

19. The method of claim 17, further comprising: after draining the residual water in the fuel cell, comparing, by the controller, the residual water drain time with the parking time when the parking of the vehicle is completed or the operation of the fuel cell is terminated; and controlling, by the controller, a driving time of the drainer according to a result of comparison of the residual water drain time with the parking time, thus draining the residual water in the fuel cell.

* * * * *